(12) United States Patent
Michael et al.

(10) Patent No.: US 7,111,298 B1
(45) Date of Patent: Sep. 19, 2006

(54) INTER-PROCESSOR COMPETITION FOR A SHARED RESOURCE

(75) Inventors: Ofer Michael, Newton, MA (US); Gilad Sade, Newton, MA (US); Clifford Lim, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 420 days.

(21) Appl. No.: 09/945,939

(22) Filed: Sep. 4, 2001

(51) Int. Cl.
*G06F 9/52* (2006.01)

(52) U.S. Cl. .................................................. 718/104
(58) Field of Classification Search ......... 718/100–108
See application file for complete search history.

(56) References Cited

U.S. PATENT DOCUMENTS

| | | | | |
|---|---|---|---|---|
| 4,189,766 A | * | 2/1980 | Horiguchi et al. | 711/151 |
| 5,167,022 A | * | 11/1992 | Bahr et al. | 710/108 |
| 5,274,809 A | * | 12/1993 | Iwasaki et al. | 718/104 |
| 5,317,749 A | * | 5/1994 | Dahlen | 710/200 |
| 5,339,443 A | * | 8/1994 | Lockwood | 710/244 |
| 5,502,840 A | * | 3/1996 | Barton | 710/200 |
| 5,553,298 A | * | 9/1996 | Merryman et al. | 718/104 |
| 5,623,670 A | * | 4/1997 | Bohannon et al. | 710/200 |
| 5,669,002 A | * | 9/1997 | Buch | 710/200 |
| 5,790,851 A | * | 8/1998 | Frank et al. | 718/104 |
| 5,864,699 A | * | 1/1999 | Merryman | 718/104 |
| 5,895,492 A | * | 4/1999 | Greenspan et al. | 711/147 |
| 5,900,018 A | * | 5/1999 | Lynch | 711/147 |
| 5,941,967 A | * | 8/1999 | Zulian | 710/107 |
| 5,987,550 A | * | 11/1999 | Shagam | 710/119 |
| 6,105,094 A | * | 8/2000 | Lindeman | 710/107 |
| 6,226,717 B1 | * | 5/2001 | Reuter et al. | 711/147 |
| 6,353,869 B1 | * | 3/2002 | Ofer et al. | 710/200 |
| 6,480,918 B1 | * | 11/2002 | McKenney et al. | 710/200 |
| 6,567,873 B1 | * | 5/2003 | Henriksen | 710/240 |

FOREIGN PATENT DOCUMENTS

| | | | | |
|---|---|---|---|---|
| JP | 58014231 A | * | 1/1983 | |
| JP | 02170259 A | * | 7/1990 | |

OTHER PUBLICATIONS

Ricart, Glenn et al. "An Optimal Algorithm for Mutual Exclusion in Computer Networks." ACM. 1991.*
Mishra, Shivakant et al. "A Robust Algoritm for Mutual Exclusion in a Computer Network." IEEE. 1987.*

* cited by examiner

*Primary Examiner*—Lewis A. Bullock, Jr.
(74) *Attorney, Agent, or Firm*—Fish & Richardson P.C.

(57) ABSTRACT

In a multi-processor system in which several processors compete for exclusive use of a shared resource, a claimant processor asserts exclusive access to a resource by determining whether there exists a competing claim to exclusive access to said resource and then posting a claim to exclusive access to said resource. Following lapse of an interval, the claimant processor then determines whether there exists a competing claim to exclusive access to said resource. Depending on whether or not such a claim exists, the claimant processor then either takes control of the resource or makes another attempt after waiting.

18 Claims, 2 Drawing Sheets

INTER-PROCESSOR COMPETITION FOR A SHARED RESOURCE

TECHNICAL FIELD

This invention relates to multi-processor systems, and in particular, to management of competition between processors.

BACKGROUND

A data storage system can include several independent processors that cooperate to increase throughput of many tasks associated with data storage and retrieval. These processors typically communicate with each other by leaving messages in a shared memory. This shared memory is constantly available to the processors for reading and writing.

Certain tasks require that a processor use a particular system resource to the exclusion of other processors. When a processor is using such a system resource, it is useful to communicate to other processors that the system resource is busy. Conversely, when a processor is done using such a system resource, it is useful to communicate to other processors that the resource is now free.

One approach to providing such communication is to leave messages in the shared memory. However, because the memory is shared, it is possible for a race condition between processors to occur. In such cases, a processor may inadvertently overwrite a message. This can result in two processors attempting to use the same resource at the same time.

To avoid the possibility of having two processors overwrite each other's messages, it is possible to partition the shared memory and to allow a processor write-access to only its partition. However, as the number of processors increases, the amount of memory allocated to each processor decreases. This can result in a processor running short of memory even though considerable memory, which might be available were it not allocated to other processors, stands idle.

Another approach is to maintain a queue for each such resource. However, management of a queue consumes system overhead. It is therefore preferable to avoid such a solution whenever possible.

SUMMARY

The invention is based on the recognition that if a race condition arises between two processors claiming the same resource, the race condition will generally be manifested within a brief interval following the near-simultaneous assertion of a claim over that resource. By allowing this interval to pass before actually using the resource, the method of the invention significantly reduces the likelihood of a race condition between two processors.

A claimant processor asserts exclusive access to a resource by first determining whether there exists a competing claim to exclusive access to the resource and then posting a claim to exclusive access to the resource. Following lapse of an interval, the claimant processor then determines whether there exists a competing claim to exclusive access to the resource.

The determination of whether there exists a competing claim can include inspecting a data-storage location to determine whether exclusive access to the resource has already been claimed. In such a case, the presence of a release code at the data storage location determines whether the resource has been released by a competitor and is therefore available.

In one practice of the invention, the claimant processor posts a claim of exclusive access to the resource by replacing data at a data-storage location with a claim code indicating a claim to exclusive access to the resource.

After waiting a suitable interval, the claimant processor determines whether the posted a message still exists or whether it has been written over by a competing processor. The suitable interval is typically selected to on the basis of time associated with determining whether there exists a competing claim and posting a claim to exclusive access.

In an alternative practice of the invention, the claimant processor determines that there exists a competing claim to the resource and following lapse of a second interval, determining whether the competing claim continues to exist. This interval can then be selected on the basis of an expected usage time for the resource. Alternatively, the interval can be selected such that each processor in the multi-processor system has a different interval.

These and other features of the invention will be apparent from the following description and the accompanying figures, in which:

DETAILED DESCRIPTION

Figure 1:
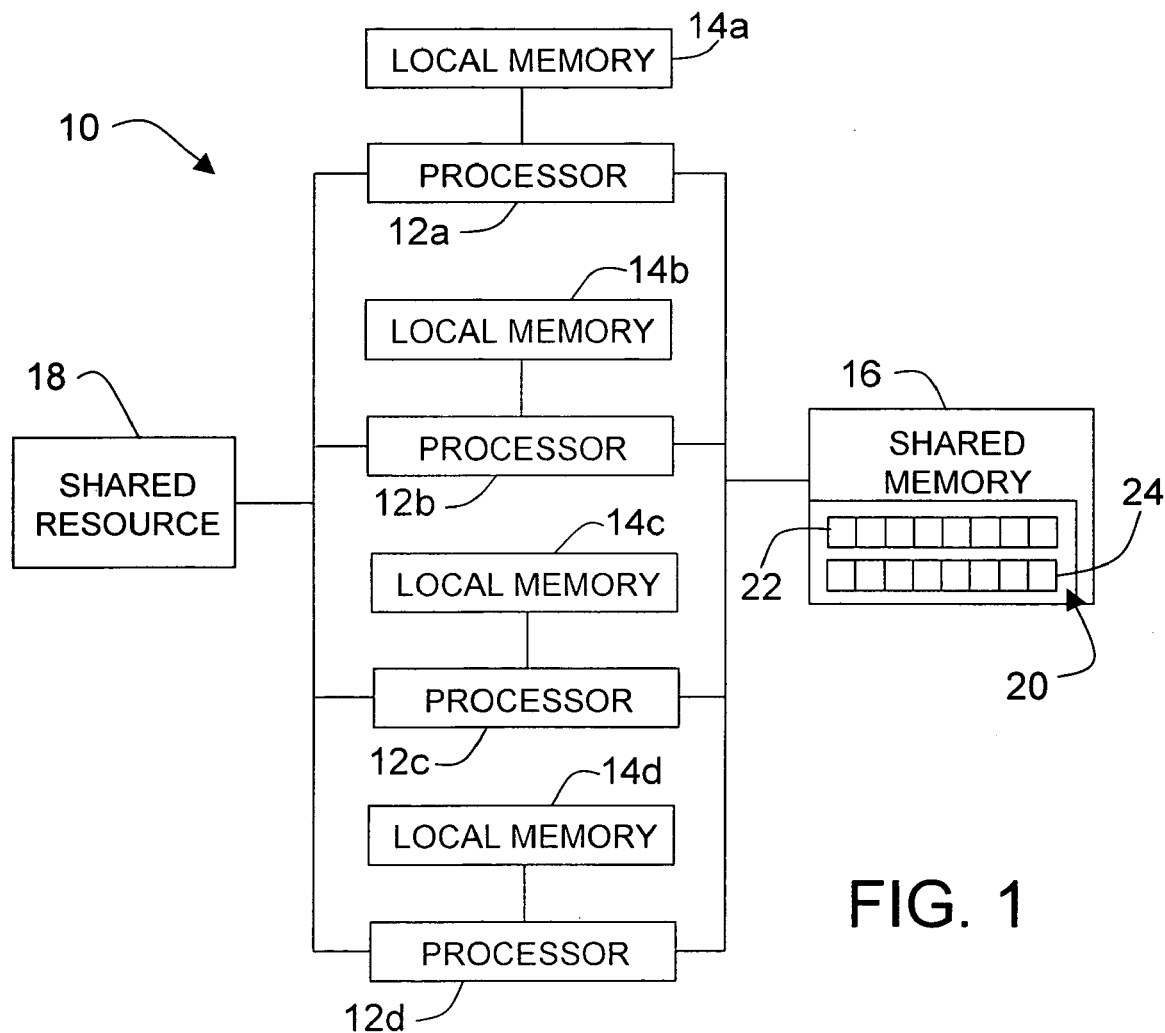
FIG. 1 shows a representative multi-processor system for practice of the invention.

A system 10 incorporating the invention includes a claimant processor 12a and a plurality of competing processors 12b–d. The claimant processor 12a is in communication with a claimant local memory 14a that is not accessible to the competing processors 12b–d. The competing processors 12b–d are in communication with corresponding local memories 14b–d that are not accessible by the claimant processor 12a. Both the claimant processor 12a and the competing processors 12b–d are also in communication with a shared memory 16. This shared memory 16 is intended to be read from and written to by any processor.

Both the terms "competing processor" and "claimant processor" are logical terms that are used to described a processor carrying out a particular role in the context of this description. Each processor 12a–d can be a claimant processor and, from the point of view of another processor, a competing processor. There is no inherent structural difference between a claimant processor 12a and a competing processor 12b–d.

The system 10 further includes one or more serially-shared resources 18 that can be accessed by the claimant processor 12a and by each of the competing processors 12b–d. Such resources are referred to as "serially shared" because although any processor 12a–d can access that resource 18, no two processors are permitted to access the resource 18 simultaneously. Each serially-shared resource 18 has a corresponding designated location 20 in the shared memory 16. The data contained in this designated location 20 indicates the status of the serially-shared resource 18 with which it is associated.

The data contained in the designated location 20 can include a lock-word 22 that stores either a release code, which indicating that the resource 18 is free, or a claim code, which indicates that the resource 18 has been claimed for exclusive use by one of the processors 12a–d. A claim code can also indicate the identity of the processor claiming that resource 18. In one embodiment, each resource 18 is associated with a lock-word 22 made up of a four-byte word in shared memory. A first portion of the word is selected to enable a processor to identify the word as being a lock-word. A second portion of the word is selected to identify a particular processor associated with the lock-word.

The designated location 20 can also include a time-stamp 24 to indicate when the resource 18 was last used, and optionally, by which processor. Although a time-stamp 24 is not necessary, its presence is useful for diagnosing irregularities in system behavior.

When a claimant processor 12a requires access to a resource 18, it first examines the lock-word 22 associated with that resource 18. If the lock-word 22 contains the release code, the claimant processor 12a writes its claim code into the lock-word 22, thereby establishing a latent claim over the resource 18. Before taking control of the resource 18, the claimant processor 12a executes a loop (to be described below) to reduce the possibility of a race condition between itself and a competing processor 12b–d. If after execution of this loop the lock-word 22 still contains the claimant processor's claim code, then the latent claim is confirmed and the claimant processor 12a can safely access the resource 18. Once the claimant processor 12a no longer needs the resource, it writes the release code into the lock-word 22 to indicate that the resource is once again free.

Figure 2:
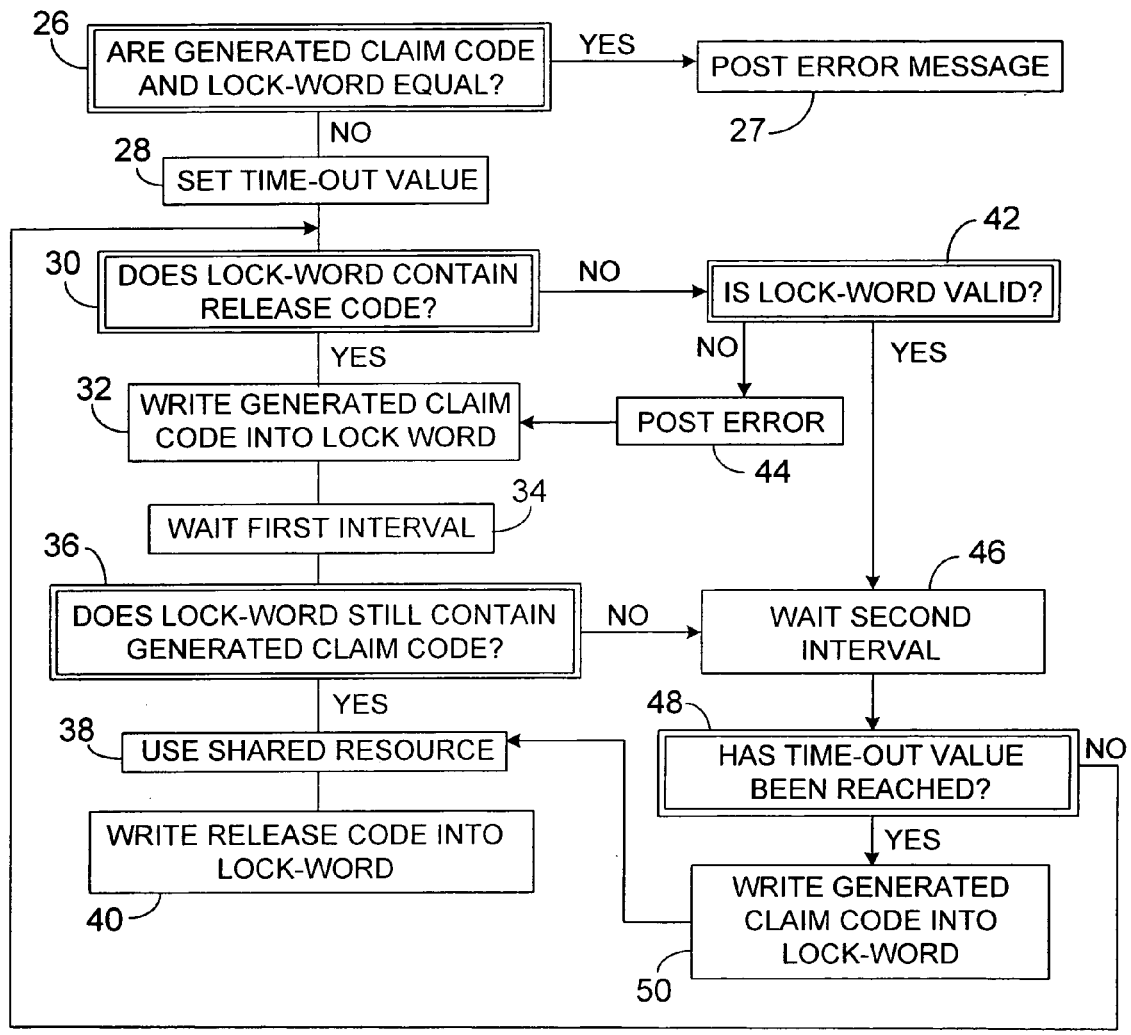
FIG. 2 is a flow-chart illustrating a representative practice of the invention.

Referring now to FIG. 2, when a claimant processor requires access to a resource, it first determines whether that resource is free. To do so, the claimant processor reads the lock-word for that resource into its local memory and generates a claim code identifying itself. The claimant processor then compares the generated claim code with the lock-word (step 26). A lock-word that is identical to the generated claim code suggests that the claimant processor has already claimed the resource. Since this is inconsistent with the claimant processor seeking to claim the resource, an error is generated (step 27).

The claimant processor next sets a time-out value (step 28). The time-out value places an upper limit on how long the claimant processor will consider the activities of competing processors. If, after expiration of a time-out period, the lock-word still indicates that a competing processor has claimed the resource, the claimant processor usurps control of the resource from the competing processor. The provision of a time-out value is useful for avoiding an interminable wait resulting from, for example, a competing processor that fails before it has had a chance to write a release code into the lock-word.

The lock-word and the generated claim code may differ because the lock-word contains a release code indicating that the resource is free. In such a case, the claimant processor can claim the resource. However, the lock-word and the generated claim code can also differ because the lock-word contains a claim code generated by a competing processor. The claimant processor responds to this condition by making another attempt to claim the resource after waiting, for a reasonable period, for that resource to be freed. In rare cases, the lock-word and the claim code may differ because the lock-word has become corrupted. When this is the case, the processor posts an error.

If the lock-word contains a release code (step 30), the claimant processor asserts a claim over the resource by replacing the release code with its claim code (step 32).

In some cases, a race condition between the processor and a competing processor can arise. This can occur because of a brief interval, after a first processor has read the lock-word but before it has written its claim code into the lock-word. If a second processor were to read the lock-word during this brief interval, it would still see a release code in lock-word. The second processor would then proceed to assert a claim over the resource, not recognizing that the first processor is ahead of it.

To avoid the foregoing race condition, the claimant processor waits for the duration of a first interval (step 34). This first interval is selected to be greater than the time required for a processor to read from and write to the shared memory. By waiting for a first interval to elapse before proceeding, the claimant processor ensures that any competing processor will have had time to complete the process of asserting a claim for the resource.

Once the first interval has passed, the claimant processor then re-reads the lock-word to verify that the lock-word still contains its claim code (step 36). If the lock-word still contains the claim code, the claimant processor proceeds to use the shared resource (step 38). Once the claimant processor no longer requires the resource, it overwrites its claim code in the lock-word with a release code (step 40).

In one practice of the invention, just before the claimant processor writes a release code into the lock-word (step 40), it first verifies that its claim code is still in the lock-word. If it is not, an error has occurred and the claimant processor posts an error message.

As noted above, in some cases, the claimant processor may discover that the lock-word does not contain the release code. When this occurs, the claimant processor determines whether the lock-word contains a valid value (step 42). In addition to the release code, valid values for the lock-word include the claim codes for all the competing processors. Since there are only a finite number of competing processors, the test to identify valid values is not prohibitive. The claim codes for the competing processors can be provided in a known location in the shared memory, or they can be provided in the local memory of the claimant processor.

If the claimant processor determines that the lock-word contains an invalid value (step 42), it generates an error (step 44). In addition, since the lock-word does not contain a claim code for a competing processor, the resource is apparently not claimed by any competing processor. Hence there is no reason for the claimant processor to refrain from asserting control over the resource. Accordingly, the claimant processor proceeds to write its claim code over the invalid value in the lock-word (step 32) and to carry on as if the lock-word had originally contained the release code.

If the claimant processor does recognize a competing processor's claim code in the lock-word, it proceeds to wait for the duration of a second interval (step 46). Once the second interval has elapsed, the claimant processor determines whether the time-out value has been reached (step 48). If the time-out value has not been reached, the claimant processor makes another attempt to assert a claim over the resource by re-reading the lock-word (step 30) and proceeding as already described above. If the time-out value has been reached, the claimant processor usurps the shared resource by replacing the contents of the lock-word with its own claim code (step 50) and proceeding to use the shared resource (step 38).

In some cases, two processors may decide, at the substantially same time, to attempt to access the resource. If this occurs while the resource is claimed by a third processor, the two processors will execute the subsequent steps in the method almost in unison. This can result in a race condition between the two processors.

To avoid such a race condition, one practice of the invention provides for staggering the individual processors relative to each other by defining a different value of the second interval for each processor. The length of the second interval can be based on a percentage of the average usage time for the resource. For example, the second interval can be the sum of a base value and an offset value, the offset value being unique to each processor. Alternatively, the second interval can be the sum of a base value and a random number selected from a pre-defined interval. A suitable value for a base value is one on the order of fifty microseconds.

The system 10 shown in FIG. 1 includes one shared resource and four processors competing for access to that resource. However, in the method described above, there is no inherent limit in the number of competing processors or the number of shared resources. A larger number of competing processors requires the definition of additional claim codes and additional second intervals. A larger number of shared resources can be accommodated by providing a separate designated region for each resource.

The system 10 is also shown as including local memories 14a–d associated with each processor 12a–d. These local memories 14a–d are useful because the comparison between the generated code word and the lock-word can proceed more quickly if the lock-word is first copied into the claimant processor's local memory 14a. However, the method described herein does not explicitly require a local memory.

We claim:

1. In a data-storage system having resources to be shared among processors, a method for asserting exclusive access to a resource by a first processor, said method comprising:
   selecting an extent of a first interval on the basis of a time required for the processors to read from and write to a location accessible to the processors;
   determining whether there exists a competing claim to exclusive access to said resource by another processor;
   posting, at the location accessible to the processors, a claim to exclusive access to said resource by said first processor;
   determining whether there exists a competing claim to exclusive access to said resource by another processor, following lapse of said first interval that begins with the posting of the claim; and
   determining whether there exists a competing claim to exclusive access to said resource by another processor, following lapse of a second interval that begins after the lapse of the first interval, wherein the second interval is selected on the basis of an expected usage time for said resource.

2. The method of claim 1, wherein determining that there exists a competing claim comprises inspecting a data-storage location to determine whether exclusive access to said resource has already been claimed.

3. The method of claim 2, wherein inspecting a data-storage location comprises determining whether said data-storage location includes a release code indicating that said resource has been released by a competitor.

4. The method of claim 1, wherein posting a claim of exclusive access comprises replacing data at a data-storage location with a claim code indicating a claim to exclusive access to said resource.

5. The method of claim 1, wherein determining whether there exists a competing claim following lapse of a first interval comprises determining whether said claim to exclusive access continues to be posted.

6. The method of claim 1, further comprising selecting an extent of said first interval on the basis of a time associated with determining whether there exists a competing claim and posting a claim to exclusive access.

7. The method of claim 1, further comprising selecting said second interval to be different from second intervals associated with competing claims for access to said resource.

8. The method of claim 1, wherein posting a claim to exclusive access further comprises posting, at a location accessible to the plurality of potential claimants, a time at which the claim of exclusive access is made.

9. The method of claim 1 further comprising asserting exclusive access to a resource after a third interval that begins with the posting of the claim.

10. A computer-readable medium having encoded thereon software for causing a first processor in a set of processors to assert exclusive access to a resource accessible by said set of processors, said software comprising instructions for:
   selecting an extent of a first interval on the basis of a time required for said processors to read from and write to a location accessible to said processors
   determining whether there exists a competing claim to exclusive access to said resource by another processor;
   posting, at the location accessible to said processors, a claim to exclusive access to said resource by the first processor;
   determining whether there exists a competing claim to exclusive access to said resource following lapse of said first interval that begins with the posting of the claim; and
   determining whether there exists a competing claim to exclusive access to said resource following lapse of a second interval that begins after the lapse of said first interval, wherein the second interval is selected on the basis of an expected usage time for said resource.

11. The computer-readable medium of claim 10, wherein said instructions for determining whether there exists a competing claim comprise instructions for inspecting a data-storage location to determine whether exclusive access to said resource has already been claimed.

12. The computer-readable medium of claim 11, wherein said instructions for inspecting a data-storage location comprise instructions for determining whether said data-storage location includes a release code indicating that said resource has been released by a competitor.

13. The computer-readable medium of claim 10, wherein said instructions for posting a claim of exclusive access comprise instructions for replacing data at a data-storage location with a claim code indicating a claim to exclusive access to said resource.

14. The computer-readable medium of claim 10, wherein said instructions for determining whether there exists a competing claim following lapse of a first interval comprise instructions for determining whether said claim to exclusive access continues to be posted.

15. The computer-readable medium of claim 10, wherein said software further comprises instructions for selecting an extent of said first interval on the basis of a time associated with determining whether there exists a competing claim, and posting a claim to exclusive access.

16. The computer-readable medium of claim 10, wherein said software further comprises instructions for selecting said second interval to be different from second intervals associated with competing claims for access to said resource.

17. The computer-readable medium of claim 10, wherein posting a claim to exclusive access of said resource further comprises posting, at a location accessible to the plurality of potential claimants, a time at which the claim of exclusive access is made.

18. The computer-readable medium of claim 10, wherein said software further comprises instructions for asserting exclusive access to a resource after a third interval that begins with the posting of the claim.

* * * * *